June 1, 1965  C. L. EMMERICH  3,186,239

MAGNETIC TORQUE AND BEARING FORCE REGULATOR

Filed July 19, 1960  2 Sheets-Sheet 1

INVENTOR.
CLAUDE L. EMMERICH
BY
ATTORNEY

INVENTOR.
CLAUDE L. EMMERICH
BY Henry L. Skenier
ATTORNEY

United States Patent Office 3,186,239
Patented June 1, 1965

3,186,239
MAGNETIC TORQUE AND BEARING FORCE REGULATOR
Claude L. Emmerich, Scarsdale, N.Y., assignor to United Aircraft Corporation, East Hartford, Conn., a corporation of Delaware
Filed July 19, 1960, Ser. No. 43,939
5 Claims. (Cl. 74—5)

My invention relates to a magnetic torque and bearing force regulator and more particularly to an improved support for the float of a gyroscope assembly.

In gyroscope assemblies it is required that the float which carries the gyroscope rotor be rotatably supported in the housing of the assembly and that the float axis be positively aligned with reference to the housing. In gyroscope assemblies of the prior art a fluid in the housing of the assembly buoyantly supports the float. Respective mechanical pivot assemblies at the ends of the float define the axis of rotation of the float. These pivot assemblies are initially adjusted to provide a minimum frictional resistance to rotation consistent with the performance of their function of defining the float axis. Upon the occurrence, for example, of relative expansion between the float and the housing, the bearing force of these pivot assemblies varies to affect the torque characteristic of the assembly in an undesirable manner.

In the gyroscope assemblies of the prior art, electrical connections must be made from the housing not only to the gyroscope motor within the float but also to the torquer and pickoff windings supported by the float. In the prior art these electrical connections are made by conductors which, owing to their elastic property, upon displacement of the float about its axis exert an undesirable restoring torque with the result that a true indication of the disturbing force producing the displacement is not provided. Since the disturbing force is not correctly sensed, an improper correcting force is generated.

I have invented a magnetic torque and bearing force regulator for use on a gyroscope float to overcome the defects of gyroscope float supports of the prior art pointed out hereinabove. My support exerts a substantially constant bearing force while permitting axial movement of the gyroscope float such as occurs, for example, upon relative expansion between the float and its housing. My regulator, upon displacement of the float about its axis, generates a torque which counteracts the effect of the undesirable restoring torque produced by the conductors providing the electrical connections between the float and its housing.

One object of my invention is to provide a magnetic torque and bearing force regulator which overcomes the defects of gyroscope float supports of the prior art.

Another object of my invention is to provide a magnetic torque and bearing force regulator which exerts a substantially constant bearing force while permitting axial displacement of the gyroscope float with respect to its housing.

A further object of my invention is to provide a magnetic torque and bearing force regulator which upon displacement of the float about its axis generates a torque which counteracts the undesirable restoring torque produced by the conductors which make electrical connections between the gyroscope housing and the gyroscope float.

Other and further objects of my invention will appear from the following description.

In general my invention contemplates the provision of a magnetic torque and bearing force regulator for a gyroscope float including magnetic bearings for supporting the gyroscope float in its housing with a predetermined bearing force while permitting axial movement of the float with respect to the housing. I so arrange my magnetic bearings as to produce, upon displacement of the float about its axis, a torque which counteracts the undesirable restoring torque produced by the conductors making electrical connections between the float and its housing.

In the accompanying drawings which form part of the instant specification and which are to be read in conjunction therewith and in which like reference numerals are used to indicate like parts in the various views.

Figure 1:
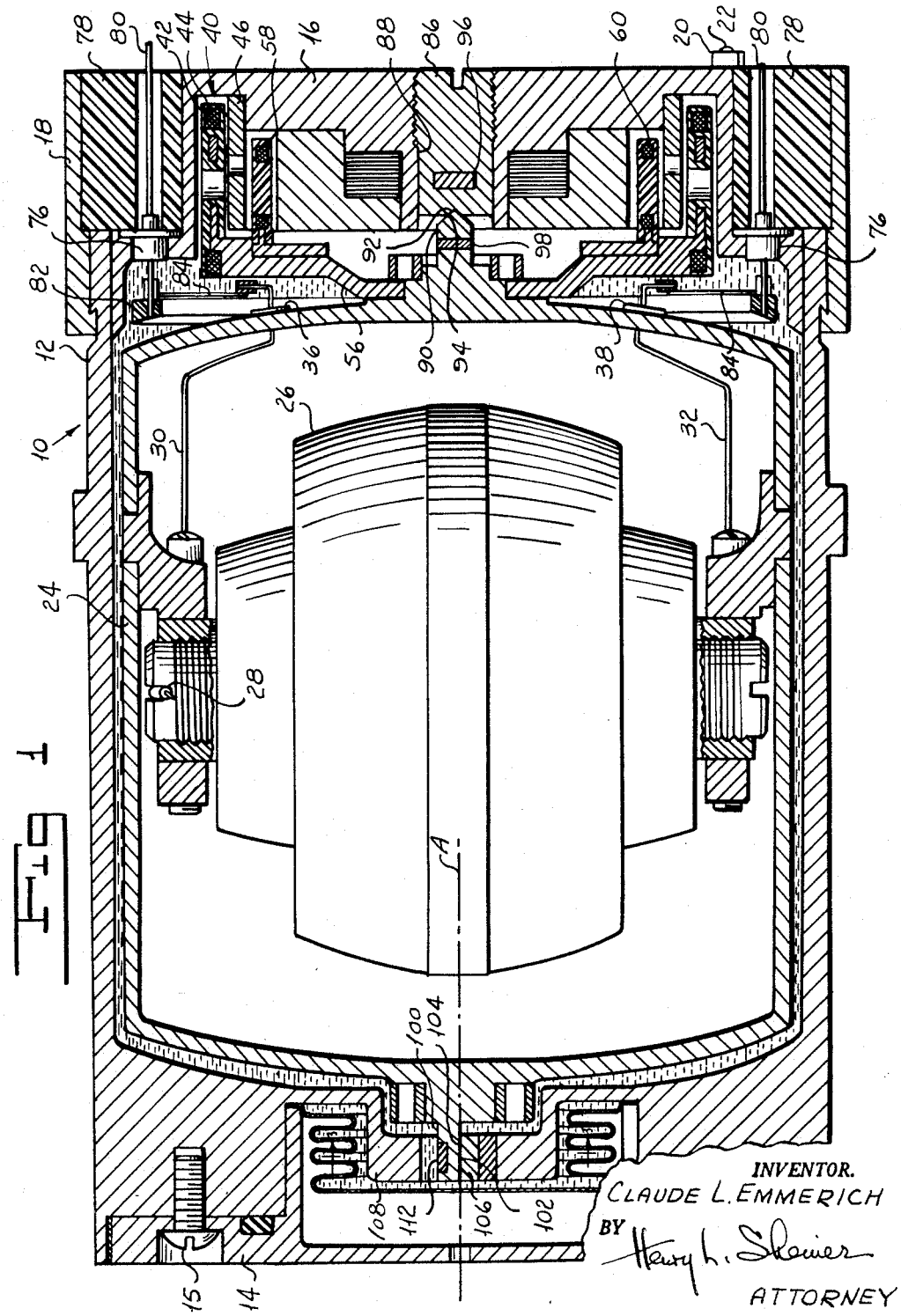
FIGURE 1 is a sectional view of a gyroscope assembly provided with my magnetic torque and bearing force regulator.
Figure 2:
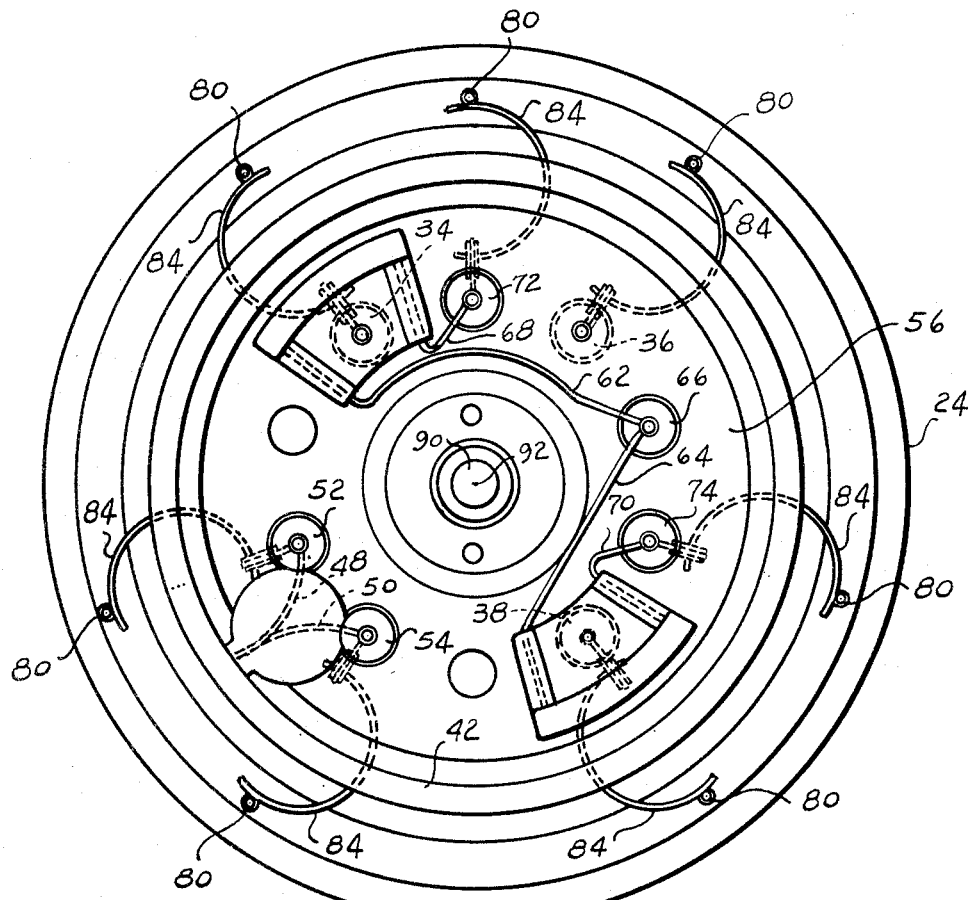
FIGURE 2 is an end view of the float of a gyroscope assembly provided with my magnetic torque and bearing force regulator and showing the assembly housing contact support.
Figure 3:
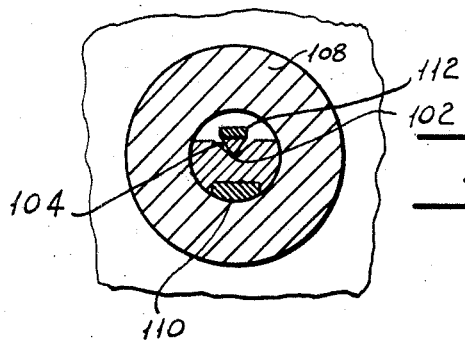
FIGURE 3 is a fragmentary sectional view of one of the magnetic bearings of my magnetic torque and bearing force regulator taken along the line 3—3 of FIGURE 1.

Referring now to the drawings, one form of gyroscope assembly, indicated generally by the reference character 10, with which my magnetic torque and bearing force regulator may be used includes a housing 12, one end of which is closed by an end plate 14 secured to the housing by any suitable means known to the art such as by screws 15. The other end of housing 12 receives a support 16. An annular retainer 18 carried by the end of the housing 12 which receives the support 16 has lugs 20 secured to the support 16 by any suitable means such as by screws 22 to retain the support 16 within the housing.

As is known in the art, the housing 12 carries fluid for buoyantly supporting the gyroscope float 24 which houses the gyroscope rotor 26. Rotor 26 is driven by a motor, not shown in detail since it is well known in the art. The rotor motor may, for example, be a three phase motor adapted to be energized by electrical conductors 28, 30 and 32. I connect the conductors 28, 30 and 32 to respective terminal posts 34, 36 and 38 carried by the float 24.

The gyroscope assembly with which my magnetic torque and bearing force regulator is used includes a torquer, indicated generally by the reference character 40, comprising a movable member 42 carrying a winding 44 and a stationary member 46 carried by the support 16. I connect respective conductors 48 and 50 leading from the torquer winding 44 to respective terminal posts 52 and 54 carried by the torquer support 56.

The gyroscope assembly includes a pair of pickoff windings 58 and 60, of a type known in the art, carried by the torquer support 56. I connect the windings 58 and 60 together by means of conductors 62 and 64 connected between the respective windings and a terminal post 66 carried by a support 56. Conductors 68 and 70 connect the other ends of the windings 58 and 60 to respective terminal posts 72 and 74 carried by the support 56.

From the structure thus far described it will be seen that I connect all the electrical components carried by the float 24 to the terminal posts 34, 36, 38, 52, 54, 72 and 74. It is required that electrical connections be made from these terminal posts to the external circuit through the housing 12. A plurality of terminal posts 76 carried by insulating blocks 78 on the support 16 receive wires 80 leading to the external circuit. A ring 82 formed of insulating material spaces these wires 80 with respect to each other. I secure a plurality of respective resilient members 84 formed of a conductive material to the respective terminal posts 34, 36 and 38 carried by the float and to the respective terminal posts 52 and 54 and 72 and 74 carried by the support 56. I so dispose the conductors 84 that they engage respective conductors 80 on the housing, which conductors lead to the external circuit. From the structure thus described it will be seen that the conductors 84, commonly known as "pigtails," provide electrical connections between the terminals carried by the float and the conductors 80.

When, in response to a disturbance, the float 24 rotates relative to the housing 12 about its axis A, the conductors 84 owing to their elastic characteristic exert a torque on the float, which torque tends to restore the float to the position from which it was displaced in response to the disturbance. This undesirable torque so affects the operation of the assembly that it may produce an incorrect indication of the disturbing force and thus result in the application of an incorrect restoring torque.

I thread or otherwise secure an end plug 86 within a bore 88 formed in the center of the support 16. I form one end of the float 24 with a shaft 90, the end of which forms a pivot 92 disposed in a recess 94 in the plug 86. Plug 86 carries a permanent magnet 96 which acts on a soft iron insert 98 in the shaft 90 to draw the pivot 92 into the recess 94.

I form the other end of the float 24 with a shaft 100 providing a knife edge 102 which rests in the base of a groove 104 formed in a plug 106 secured in a boss 108 in the housing 12. Plug 106 carries a permanent magnet 110 which acts on a soft iron insert 112 in the shaft 100 to hold the knife edge 102 in the base of slot 104. From the structure just described it will be seen that the magnet 96 holds pivot 92 in the recess 94 while magnet 110 holds the knife edge 102 in the base of groove 104.

In operation of my magnetic torque and bearing force regulator, the magnets 96 and 110 function in the manner described hereinabove to define the axis of rotation of the float 24 while providing a substantially constant bearing force. At the same time the float may shift axially with respect to the housing 12 without appreciably affecting the bearing force provided by the magnets.

Upon the occurrence of a displacement of the float 24 about its axis A, in response to a disturbing force the wires 84 act in the manner described hereinabove to produce an undesirable torque which resists this displacement. When such a displacement occurs, however, the soft iron insert 112 in the shaft 100 moves closer to the magnet 110 with the result that a torque is produced which acts against the undesirable restoring torque produced by the wires 84. In this manner the undesirable restoring torque provided by the wires 84 is prevented from affecting the operation of the device.

It will be seen that I have accomplished the objects of my invention. I have provided a magnetic torque and bearing force regulator which is especially adapted for use as a gyroscope float support. My regulator provides a substantially constant bearing force while permitting axial movement of the float. In addition, my regulator generates a torque which overcomes the undesirable restoring torque generated by the conductors which make electrical connections from the float to the housing.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A bearing assembly for mounting a member for rotary movement about an axis on a support including in combination a first interacting magnetic system carried by said member and by said support acting substantially solely in the direction of said axis for holding said member in engagement with said support and a second interacting magnetic system carried by said member and by said support acting in a direction substantially solely perpendicular to said axis to hold said member in engagement with said support.

2. In a bearing assembly for mounting a first member on a second member for rotary displacement about an axis from a null position a bearing including in combination means forming a notch in one of said members, means forming a knife edge on the other one of said members, and interacting means comprising a magnet an element of magnetic material for holding said knife edge in said notch, and means mounting said magnet and said element of magnetic material respectively on said members in positions such that said magnet and said element move toward each other when said other member pivots on its knife edge.

3. In a gyroscope assembly frame, a gyroscope rotor support and means comprising first and second bearings each comprising interengageable elements on said support and on said frame and a magnetic system for urging said interengageable members into engagement rotatably to mount said support on said frame while permitting movement of said support in the direction of its axis of rotation.

4. In a gyroscope assembly a frame, a gyroscope rotor support, means comprising respective first and second bearings each comprising interengageable elements on said support and on said frame and a magnetic system for urging said interengageable members into engagement to mount said support on said frame for displacement about an axis while permitting movement of said support in the direction of said axis, each of said systems comprising a magnet carried by one of the said support and said frame and a magnetic member carried by the other one of said support and said frame.

5. In a gyroscope assembly a frame, a gyroscope rotor support, means comprising first and second bearings each comprising a magnetic system for mounting said support on said frame for displacement about an axis while permitting axial movement of said support, said first bearing comprising means forming a pivot recess in one of said frame and said support and a pivot pin carried by the other one of said frame and said support, and interacting means comprising a magnet carried by one of said frame and said support and a member formed of magnetic material carried by the other one of said frame and said support for holding said pivot pin in said recess, the second bearing comprising means forming a notch on one of said frame and said support, means forming a knife edge in the other one of said frame and said support, and interacting means comprising a magnet carried by one of said frame and said support and a member formed of magnetic material carried by the other one of said frame and said support for holding said knife edge in said notch.

References Cited by the Examiner

UNITED STATES PATENTS

| | | | |
|---|---|---|---|
| 730,613 | 6/03 | Cox | 74—5 X |
| 1,589,039 | 6/26 | Anschutz-Kaempfe | 308—10 X |
| 2,340,122 | 1/44 | Hansen | 308—10 |
| 2,662,410 | 12/53 | Ballard et al. | 74—5.4 |
| 2,809,526 | 10/57 | Lundberg | 74—5 |
| 2,828,627 | 4/58 | Gabrielson | 74—5 |
| 2,859,625 | 11/58 | Bonnell | 74—5.7 |
| 2,900,211 | 8/59 | Green | 308—10 |
| 2,996,631 | 8/61 | Evans | 74—5 X |

FOREIGN PATENTS

| | | |
|---|---|---|
| 829,389 | 1/52 | Germany. |
| 856,396 | 11/52 | Germany. |

BROUGHTON G. DURHAM, *Primary Examiner.*

MILTON O. HIRSHFIELD, *Examiner.*